May 12, 1970 D. P. THURNELL 3,512,092
APPARATUS FOR SYNTHESIZING SINE WAVES
Filed June 21, 1967 2 Sheets-Sheet 1

Inventor: Duncan Philip Thurnell
By Kemon Palmer Stewart & Estabrook
Attorneys

May 12, 1970 D. P. THURNELL 3,512,092

APPARATUS FOR SYNTHESIZING SINE WAVES

Filed June 21, 1967 2 Sheets-Sheet 2

Inventor:
Duncan Philip Thurnell
By
Kemon, Palmer, Stewart & Estabrook
Attorneys

United States Patent Office 3,512,092
Patented May 12, 1970

3,512,092

APPARATUS FOR SYNTHESIZING SINE WAVES

Duncan Philip Thurnell, Rose Corner, 2 Steyning Road, Seaford, Sussex, England

Filed June 21, 1967, Ser. No. 647,869
Claims priority, application Great Britain, June 21, 1966, 27,755/66
Int. Cl. H03b *19/00*
U.S. Cl. 328—14 10 Claims

ABSTRACT OF THE DISCLOSURE

Sine-wave synthesizing apparatus comprising a pulse source coupled through dividers to a plurality of flip-flops to give square waves having frequencies *f*, 3*f*, 5*f* and 7*f*, and amplitudes A, A/3, A/5 and A/7. The waves are combined in a summing network and the resultant wave is substantially sinusoidal, the 3*f*, 5*f* and 7*f* waves being added in antiphase to the *f* wave directly in the network or all the waves being converted into corresponding triangular waves by integration and added in the network.

Figures 1, 2:
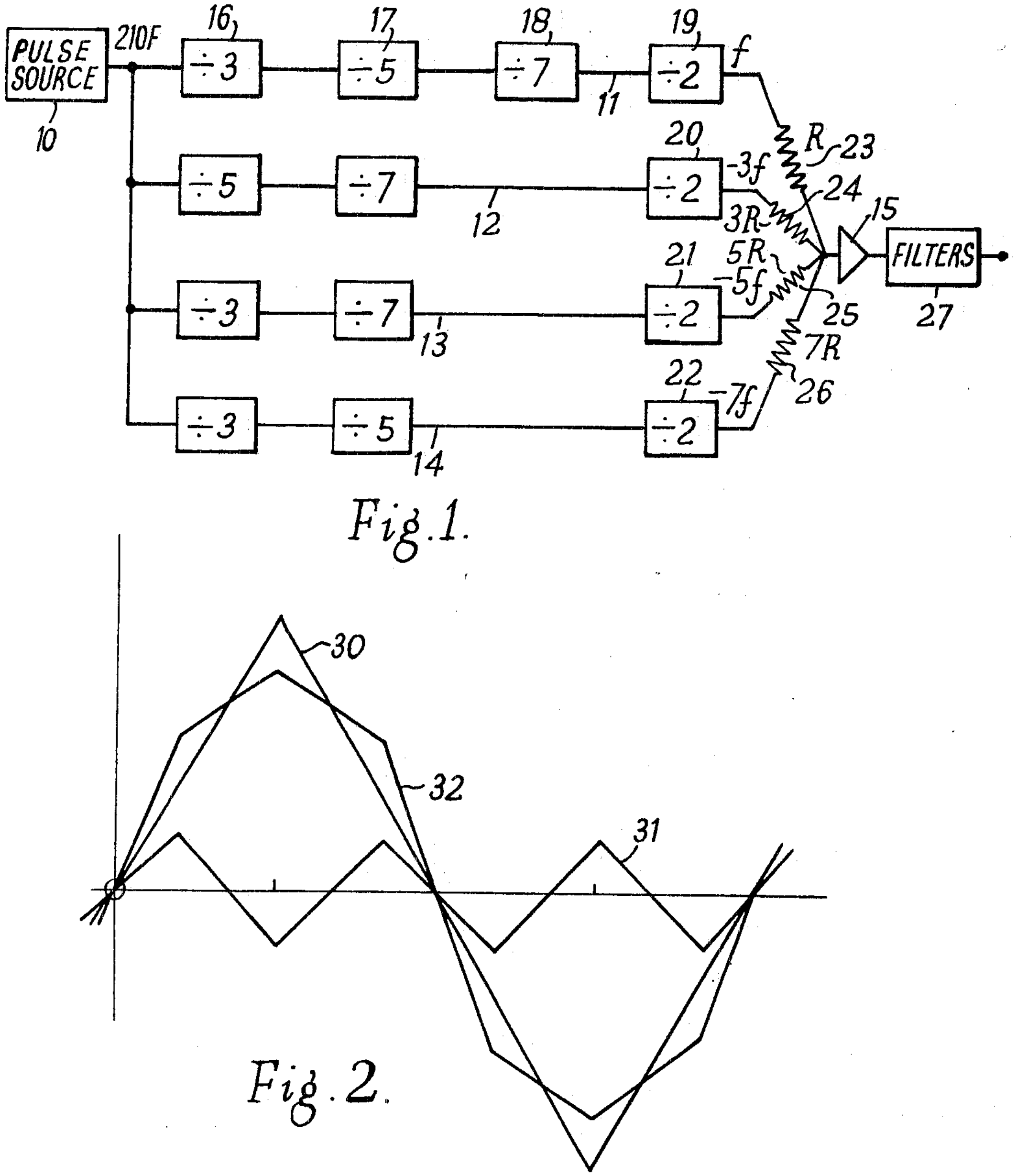

The present invention relates to synthesizing sine waves from square or triangular waves.

A requirement exists for two sine-wave oscillations of the same or related frequencies which are out of phase by a given amount, for example 90°, and whose frequencies can be varied while maintaining the same amplitude and phase relationships between the oscillations. This requirement is difficult to fulfill with conventional oscillators and phase shift networks, since the amplitude and phase of the output oscillations tend to vary with frequency.

According to the present invention there is provided apparatus for synthesizing sinusoidal oscillations, comprising a generator for providing a primary oscillation of non-sinusoidal waveform, means for generating a series of further oscillations having the same waveform as the primary oscillation but repetition frequencies which are an integral number times the repetition frequency of the primary oscillation, and means for so combining the primary and further oscillations that the waveform of the output signal from the combining means approaches a sinusoid, the frequencies and amplitudes of the further oscillations being such that when, in the combining means, all the further oscillations are added to, or subtracted from, the primary oscillations, or some further oscillations are added to, and some substracted from, the primary oscillations, cancellation of the significant harmonics of the primary oscillation takes place.

The primary and further oscillations may be of square waveform. The series of further oscillations will then have repetition frequencies which are odd numbers times that of the primary oscillation, and their amplitudes will be fractions of the amplitude of the primary oscillation having denominators equal to the corresponding odd number. For example the repetition frequencies of the further oscillations may be 3, 5 and 7 times that of the primary oscillations, and the corresponding amplitudes will be 1/3, 1/5 and 1/7 of the primary-oscillation amplitude. When synthesizing from square waves further oscillations are subtracted from the primary oscillation.

The waveform of the primary and further oscillations may instead be triangular, with rise time equal to fall time. The frequencies of the further oscillations may be those mentioned for square waves but in this case the primary and further oscillations are added.

If a second sinusoidal waveform is produced by using in additional combining means, and delay, proportional to repetition frequency, is introduced into the path of the oscillations, added or subtracted in the additional combining means, the second sinusoidal waveform will be out of phase with the first by an amount dependent on the delay. The frequency of both sinusoidal oscillations can then be varied by varying frequency of the primary oscillation, and the phase difference can be varied by varying the delay introduced.

The theoretical basis of the synthesis of sine waves from square waves will now be described.

A square wave of angular repetition frequency $\omega$ has the following components:

$$\text{Sin } wt+\tfrac{1}{3}\sin 3\,wt+\tfrac{1}{5}\sin 5\,wt+\tfrac{1}{7}\sin 7\,wt+\tfrac{1}{9}\sin wt+\ldots$$

where the amplitude of the fundamental component, sin *wt* is one. Similarly the components of a square wave of amplitude one third of the fundamental component of the first square wave and three times its frequency are:

$$\tfrac{1}{3}\sin 3\,wt+\tfrac{1}{9}\sin 9\,wt+\tfrac{1}{15}\sin 15\,wt\ldots$$

and those of a square wave of a fifth of the amplitude of the fundamental component of the first square wave and five times its frequency are:

$$\tfrac{1}{5}\sin 5\,wt+\tfrac{1}{15}\sin 15\,wt\ldots$$

If the second square wave, i.e. that of angular frequency 3*w*, is subtracted from first or primary square wave no components of angular frequencies 3*w*, 9*w* and 15*w* will be present in the resultant signal. Similarly the components of angular frequency 5*w* and 7*w* can be eliminated by taking the third square wave, i.e. that of angular frequency 5*w*, and one of angular frequency 7*w* from the first square wave. The process cannot be carried out indefinitely since some high frequency components do not continue to cancel. For example subtraction of the third square wave restores a component at angular frequency 15*w* which was eliminated by subtracting the second wave. However by subtracting square waves of angular frequency 3*w*, 5*w* and 7*w* a sine wave with harmonic below 3% can be produced. Further harmonics may be removed by filters. Since the remaining harmonics are well removed in frequency from the fundamental and are already of low level in comparison with the fundamental, the filters required present little difficulty of design and require only a comparatively low loss at the frequency to be rejected. Moreover a single filter will suffice even where the fundamental frequency varies over a range of 2 to 1 or more.

The invention will now be described, by way of example, with reference to the accompanying drawings in which:

FIG. 1 is a block diagram of a synthesizer according to the invention,

FIG. 2 indicates how a sine wave can be synthesized from triangular waves, and

Figure 3:
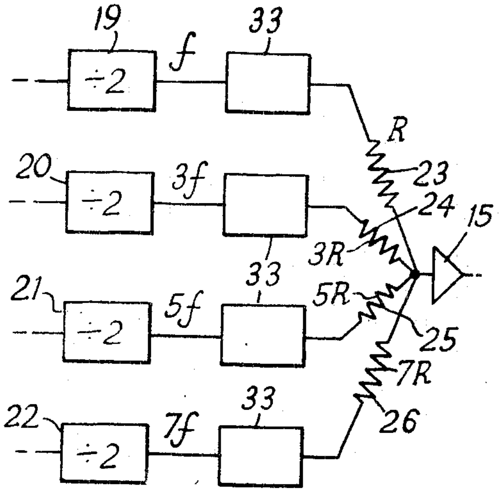

FIG. 3 shows a modification of the synthesizer of FIG. 1.

Referring to FIG. 1 a pulse source 10 provides short pulses at a repetition frequency of 210*f*. These pulses are supplied by way of four division chains 11, 12, 13 and 14 to a summing amplifier 15. The chain 11 contains three pulse dividers 16, 17 and 18 dividing by three, five and seven, respectively, and a flip-flop circuit 19 providing a square wave of repetition frequency *f*. Channels 12, 13 and 14 provide square waves of frequencies 3*f*, 5*f* and 7*f* respectively, but the output from their final flip-flop circuits 20, 21 and 22 is taken out of phase with the output from circuit 19. The outputs from the channels are applied to the summing amplifier 15 through resistors 23, 24, 25 and 26 of resistances R, 3R, 5R and 7R respectively.

The circuit of FIG. 1 thus subtracts, from a primary square wave, further square waves of repetition frequencies three, five and seven times that of the primary square wave, and a sine wave is synthesized in the way hereinbefore described. Filters 27 may be used to attenuate any of the harmonics remaining in the synthesized sine wave.

The synthesis of a sine wave from triangular waveforms will now be described with reference to FIGS. 2 and 3. In FIG. 2 there are shown a primary triangular-wave oscillation 30 and a further triangular-wave 31 of three times the repetition frequency of the wave 30 which are added together. The wave so formed which is shown at 32, can be seen to be nearer to a sine wave than the primary wave. The addition of further triangular waves of smaller amplitude and of repetition frequencies a higher odd number times that of the primary wave may be used to reduce the harmonics in the resultant sine wave.

The circuit of FIG. 1 modified as shown in FIG. 3 by the addition of an integrator 33 between each of the flip-flop circuits 19 to 22 and the resistors 23 to 26, respectively, which can be for example a capacitive integrator, could be used for synthesizing from triangular waves, the square waves from the flip-flop circuits being integrated to provide triangular waves. In this case the outputs from the flip-flop circuits are all taken in phase so that the triangular waves are added.

If the frequency of the synthesized sine wave is to be changed and its amplitude is to be invariant the rate of integration must also be changed that is the rate of rise of the integrator's output signals must be proportional to the repetition frequency of the primary wave. Such a change in rate of rise with change in frequency can be achieved, for example, by making the "aiming voltage," that is the voltage from which the integrating capacitor, or its equivalent, is charged, proportional to the repetition frequency of the primary oscillation.

The above mentioned sine-wave synthesizers are useful where it is required to produce a circular trace on a cathode ray oscilloscope to act as to visual time base for superimposed pulse signals. The circular trace is displayed by applying two signals, 90° out of phase, to the X and Y plates, respectively, of the oscilloscope. The time base frequency must be variable and thus the requirement mentioned in the second paragraph of this specification must be substantially fulfilled. If a pulse source, such as the source 10 of FIG. 1, is used to supply pulses to two sets of dividers each synthesizing one sine wave, and a relative delay is introduced between the pulses supplied to the sets of dividers, the sine waves synthesized will be out of phase by an amount dependent on the delay.

I claim:

1. Apparatus for synthesizing sinusoidal oscillations, comprising:

(a) a common source of oscillations of non-sinusoidal waveform;

(b) primary frequency dividing means coupled to said common source to provide a primary oscillation of non-sinusoidal waveform;

(c) a plurality of further frequency dividing means coupled to said common source and in parallel with said primary frequency dividing means for providing respectively a series of further oscillations having the same waveform as the primary oscillations but at repetition frequencies which are respective predetermined integral numbers greater than 1 of times the repetition frequency of the primary oscillation and with amplitudes which are inversely related to the amplitude of the primary oscillation by the same numbers respectively; and (d) means for combining the primary and further oscillations with the significant overtones in the Fourier expansion of the primary oscillation in cancelling opposition to at least some of the further oscillations to thereby produce a synthesized sine wave.

2. Apparatus as claimed in claim 1, wherein the said further frequency dividing means provide the further oscillations at repetition frequencies which are respectively odd integral numbers of times the repetition frequency of the primary oscillation.

3. Apparatus as claimed in claim 1, wherein the said combining means includes a summing network.

4. Apparatus for synthesizing sinusoidal oscillations, comprising:

(a) a common source of pulses;

(b) primary dividing means coupled to said common source;

(c) a primary flip-flop circuit coupled to the primary dividing means to provide a primary square wave;

(d) further dividing means coupled to said common source and in parallel with said primary dividing means;

(e) a plurality of further flip-flop circuits coupled to said further dividing means for providing respectively a series of further square waves having repetition frequencies which are respectively three, five, and seven times the repetition frequency of the primary square wave and amplitudes which are inversely related to the amplitude of the primary square wave by the same numbers respectively; and (f) means for subtracting the further square waves from the primary square wave to thereby produce a synthesized sine wave.

5. Apparatus as claimed in claim 4, wherein the said subtracting means includes a summing network having a plurality of input terminals of which each is coupled to an output terminal of a respective one of the said flip-flop circuits, the said output terminals of the said plurality of flip-flop circuits being out of phase with the said output terminal of the primary flip-flop circuit.

6. Apparatus according to claim 5, wherein the summing junction of the summing network is coupled to output filter means for attenuating residual harmonics of an output sinusoidal oscillation at the frequency of the primary oscillation.

7. Apparatus for synthesizing sinusoidal oscillations, comprising:

(a) a common source of pulses;

(b) primary dividing means coupled to said common source;

(c) a primary flip-flop circuit coupled to said primary dividing means;

(d) primary wave-form shaping means coupled to said primary flip-flop circuit to generate a primary triangular wave;

(e) further dividing means coupled to said common source and in parallel with said primary dividing means;

(f) a plurality of further flip-flop circuits coupled to said further dividing means;

(g) a plurality of further wave-form-shaping means coupled respectively to said further flip-flop circuits to provide a series of further triangular waves having repetition frequencies which are respectively three, five and seven times the repetition frequency of the primary triangular wave and amplitudes which are inversely related to the amplitude of the primary wave by the squares of the same numbers respectively; and (h) means for adding the further triangular waves to the primary triangular wave to thereby produce a synthesized sine wave.

8. Apparatus as claimed in claim 7, wherein each of the said flip-flop circuits has a respective output terminal coupled to a respective integrator to form sawtooth waveforms from the square waves produced by said flip-flop circuits.

9. Apparatus as claimed in claim 8, wherein the said output terminals are in phase and each integrator is coupled in like manner to a respective input terminal of a summing network.

10. Apparatus as claimed in claim 9, wherein the summing junction of the summing network is coupled to output filter means for attenuating residual harmonics of an output sinusoidal oscillation at the frequency of the primary oscillation.

References Cited

UNITED STATES PATENTS

| | | | |
|---|---|---|---|
| 2,566,085 | 8/1951 | Green | 328—27 X |
| 2,621,295 | 12/1952 | Lacy | 328—178 |
| 2,748,278 | 5/1956 | Smith | 328—21 X |
| 2,850,668 | 9/1952 | Katz | 328—158 X |
| 3,002,142 | 9/1961 | Vensen | 328—156 X |
| 3,081,434 | 3/1963 | Sandberg | 328—22 |

JOHN S. HEYMAN, Primary Examiner

U.S. Cl. X.R.

328—27, 16, 22, 156, 178